US009098468B2

(12) United States Patent
Zhang

(10) Patent No.: US 9,098,468 B2
(45) Date of Patent: Aug. 4, 2015

(54) METHOD FOR SWITCHING NODE MAIN-STANDBY CONTROLLERS BASED ON CONTENT DELIVERY NETWORK (CDN) AND CDN THEREOF

(75) Inventor: Bin Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 683 days.

(21) Appl. No.: 13/391,019

(22) PCT Filed: Jun. 11, 2010

(86) PCT No.: PCT/CN2010/073849
§ 371 (c)(1),
(2), (4) Date: Feb. 17, 2012

(87) PCT Pub. No.: WO2011/020367
PCT Pub. Date: Feb. 24, 2011

(65) Prior Publication Data
US 2012/0151550 A1 Jun. 14, 2012

(30) Foreign Application Priority Data
Aug. 20, 2009 (CN) .......................... 2009 1 0189610

(51) Int. Cl.
*G06F 11/20* (2006.01)
*H04L 29/08* (2006.01)
*H04L 1/22* (2006.01)
(Continued)

(52) U.S. Cl.
CPC ........ *G06F 11/2028* (2013.01); *G06F 11/2041* (2013.01); *H04L 1/22* (2013.01); *H04L 43/0817* (2013.01); *H04L 43/10* (2013.01); *H04L 69/40* (2013.01); *H04N 21/2404* (2013.01); *H04N 21/2405* (2013.01); *H04L 67/1034* (2013.01)

(58) Field of Classification Search
None
See application file for complete search history.

(56) References Cited

U.S. PATENT DOCUMENTS 5,583,796 A * 12/1996 Reese .......................... 702/185
6,628,649 B1 * 9/2003 Raj et al. ...................... 370/360
(Continued)

FOREIGN PATENT DOCUMENTS

CN 101119318 A 2/2008
CN 101335702 A 12/2008
(Continued)

OTHER PUBLICATIONS

International Search Report (in Chinese with English translation) for PCT/CN2010/073849, mailed Sep. 16, 2010; ISA/CN.

*Primary Examiner* — Robert C Scheibel
*Assistant Examiner* — Saba Tsegaye
(74) *Attorney, Agent, or Firm* — Harness, Dickey & Pierce, PLC

(57) ABSTRACT

A method for switching node main-standby controllers based on content distribution network is disclosed by the present invention, including the process that a node standby controller detects the status of the current node main controller, and when the node main controller is abnormal, the node standby controller selects one node standby controller to be the new node main controller by replacement according to a preset rule. A content distribution network is also disclosed by the present invention. The present invention can avoid the problem that a manager changes the node main controller blindly, which is caused by a network anomaly while not the failure of the node main controller, thus the performance of the manager is effectively improved and the bandwidth of the network is saved.

12 Claims, 3 Drawing Sheets

(51) Int. Cl.
*H04L 12/26* (2006.01)
*H04N 21/24* (2011.01)
*H04L 29/14* (2006.01)

(56) References Cited

U.S. PATENT DOCUMENTS

| | | | |
|---|---|---|---|
| 6,751,188 B1 * | 6/2004 | Medved et al. | 370/216 |
| 7,158,985 B1 * | 1/2007 | Liskov | 707/101 |
| 7,725,767 B2 * | 5/2010 | Sasaki | 714/13 |
| 2002/0055989 A1 * | 5/2002 | Stringer-Calvert et al. | 709/220 |
| 2003/0154431 A1 | 8/2003 | Lin et al. | |
| 2005/0025179 A1 | 2/2005 | McLaggan et al. | |
| 2005/0159927 A1 * | 7/2005 | Cruz et al. | 702/188 |
| 2009/0077412 A1 | 3/2009 | Langford et al. | |

FOREIGN PATENT DOCUMENTS

| | | |
|---|---|---|
| CN | 101640688 A | 2/2010 |
| WO | WO-2008127372 A2 | 10/2008 |

* cited by examiner

METHOD FOR SWITCHING NODE MAIN-STANDBY CONTROLLERS BASED ON CONTENT DELIVERY NETWORK (CDN) AND CDN THEREOF

CROSS-REFERENCE TO RELATED APPLICATIONS

This application is a 371 U.S. National Stage of International Application No. PCT/CN2010/073849, filed Jun. 11, 2010, and claims priority to Chinese patent application No. 200910189610.X, filed Aug. 20, 2009, the disclosures of which are herein incorporated by reference in their entirety.

TECHNICAL FIELD

The present invention relates to the field of communication, and in particular, to a method for switching node main-standby controller based on content distribution network (CDN) and a CDN network.

BACKGROUND OF THE RELATED ART

The content distribution network or content delivery network (CDN) is one kind of new network framework, which can release the service content to the "edge" of the network nearest to the user, to make the user can obtain the nearest required content and improve the operating efficiency of the system. Along with the rapid development of the network, the CDN is used in the commercial system in the real life, such as internet protocol television (IPTV), global eyes and so on, which has a very good prospect. In these commercial systems, the CDN is generally operated coordinating with other modules, which mainly includes the stream media system and some corresponding terminal equipments. The CDN belongs to the service layer, and mainly used to schedule and process the related service; and the stream media system mainly takes charge of implementing the service.

The CDN is mainly composed of the CDN manager and the CDN node, wherein one CDN node is composed of several CDN agents (node controller) and other attached equipments. The CDN manager takes charge of the traffic load balance of the CDN and the distribution and scheduling of the content, and one CDN manager generally manages several CDN nodes. The CDN node is the service entity of the CDN, which is deployed at the edge of the network and provides services for the nearest user. The CDN agent is a CDN node controller, which takes charge of the load balance management of the node and the content management in the node, implementing the service control of the CDN node. At the same time, only one CDN agent controls the CDN node and this CDN agent is called node main controller, while other CDN agents are the node standby controllers.

The current implementing methods mainly use the main-standby controller changeover triggered by the manager as an original version, that is, the manager uses the heartbeat message detecting mechanism based on the wide area network. If the network is abnormal and the node controller does not respond for a long time, then the manager considers that the node controller is abnormal and set the current node main controller as standby, and then blindly searches other node controllers of which the heartbeat message is normal. In fact, in most cases, the status of the current node main controller is always normal; however, the communication problem of the wide area network makes the manager reject the current node main controller. Originally the current node main controller possesses the services capability, however, the heartbeat message to the manager is abnormal, then the manager navigates the services request of the requester to other node controllers through the service logic, which wastes the services capability of the current node controller greatly. Furthermore, if the wide area network is in a good and bad status for a long time, then the manager will certainly detect and switch all the controllers in the present node frequently, which causes the switch vibration and consumes the performance of the manager and the bandwidth of the network.

SUMMARY OF THE INVENTION

The technical problem to be solved by the present invention is to provide a method for switching node main-standby controller based on content distribution network (CDN) and a CDN network, which can save resources.

The technical problem of the present invention can be solved through the following technical scheme:

a method for switching node main-standby controller based on content distribution network (CDN) comprises:

a node standby controller detecting status of a current node main controller; and when a node main controller is abnormal, the node standby controller selecting one node standby controller to be a new node main controller by replacement according to a preset rule.

The process of the node standby controller selecting one node standby controller to be the new node main controller by replacement according to the preset rule comprises the following steps:

A, the node standby controller which firstly detects that the current node main controller is abnormal, selecting one node standby controller as the new node main controller according to the preset rule and sending a switching request to notify the node standby controller;

B, the selected node standby controller is switched to be the new node main controller based on the switching request, notifying a switching result to other standby controllers and reporting to a manager.

The node standby controller detects the status of the node main controller through a heartbeat message.

Before the step A, the method further comprises a step that all node standby controllers detect other node standby controllers respectively and exchange and store performance parameters mutually; wherein, the preset rule comprises a rule of selecting the node standby controller with a normal status and an optimal performance according to the status and the performance parameter of the node standby controller.

The performance parameter comprises a CPU usage rate and I/O waiting time.

In step B, the selected node standby controller is switched to be the new node main controller through setting its own status as the node main controller.

In step B, the node standby controller notifies the switching result to other standby controllers through sending a broadcast message.

Before the node standby controller detecting the status of the current node main controller, the method further comprises a step that the manager sets a configured first node controller as the node main controller and sets a subsequently configured node controller and a newly added node controller as the node standby controller; after the step B, the method further comprises a step that the abnormal node main controller, after returning to normal, sets itself as the node standby controller.

In the step B, the manager, after receiving the switching result, sends a service signaling to the new node main controller.

The step B further comprises that the manager, when not receiving the heartbeat message of the current node main controller, does not send the service signaling temporarily.

A content distribution network (CDN), comprises a manager, one node main controller and at least one node standby controller, wherein the manager is configured to take charge of traffic load balance of the CDN, the node main controller is configured to control the CDN node, and the node standby controller is configured to detect the node main controller and when detecting that the node main controller is abnormal, select one node standby controller to be a new node main controller by replacement.

A first node standby controller which firstly detects that the node main controller is abnormal selects a second node standby controller complying with a preset rule as the new node main controller and sends a switching request to notify the second node standby controller; and the second node standby controller is switched to be the new node main controller based on the switching request and notifies the switching result to other standby controllers and reports to the manager.

The node standby controllers detect each other in pairs, and exchange and store performance parameters of opposite side mutually; the preset rule comprises a rule of selecting the node standby controller with a normal status and an optimal performance according to the status and the performance parameter of the node standby controller.

The second node standby controller is further configured to set its own status as the node main controller based on the switching request.

The manager is configured to set a configured first node controller as the node main controller and set a subsequently configured node controller and a newly added node controller as the node standby controller; and the node main controller is further configured to, when returning to normal after abnormal, set itself as the node standby controller.

The benefit effect of the present invention, compared with the existing technology, is:

(1) the present invention uses a node standby controller to detect the current node main controller, and when the node main controller is abnormal, the node standby controller selects one node standby controller to be a new node main controller by replacement according to a preset rule; since the node main controller and the node standby controller in the same node exist in the same gateway at the same time, the present invention avoids the problem that a manager changes the node main controller blindly, which is caused by a network anomaly while not the failure of the node main controller, thus the performance of the manager is effectively improved and the bandwidth of the network is saved.

(2) in the present invention, the node standby controller, after selecting a new node main controller, converts it into the node main controller by triggering, thus in this way, although the network is abnormal between the manager and the controller, it can implement the normal switching and improves the robustness of the system.

(3) in the present invention, the node standby controllers exchange performance parameters with each other. When the node main controller is faulted, any one node standby controller which firstly finds it can select one node standby controller with the optimal performance through its stored performance parameter, and switches it to be the node main controller, further optimizing the network control capability and effectively saving the overhead of the manager when selecting the controller.

PREFERRED EMBODIMENTS OF THE PRESENT INVENTION

The present invention is further described in detail with reference to the accompanying drawings and in combination with specific embodiments hereinafter.

When a node main controller is abnormal, a node standby controller which firstly finds that the node main controller is abnormal selects one node standby controller according to a preset rule and triggers the node standby controller to be a new node main controller.

Figure 1:
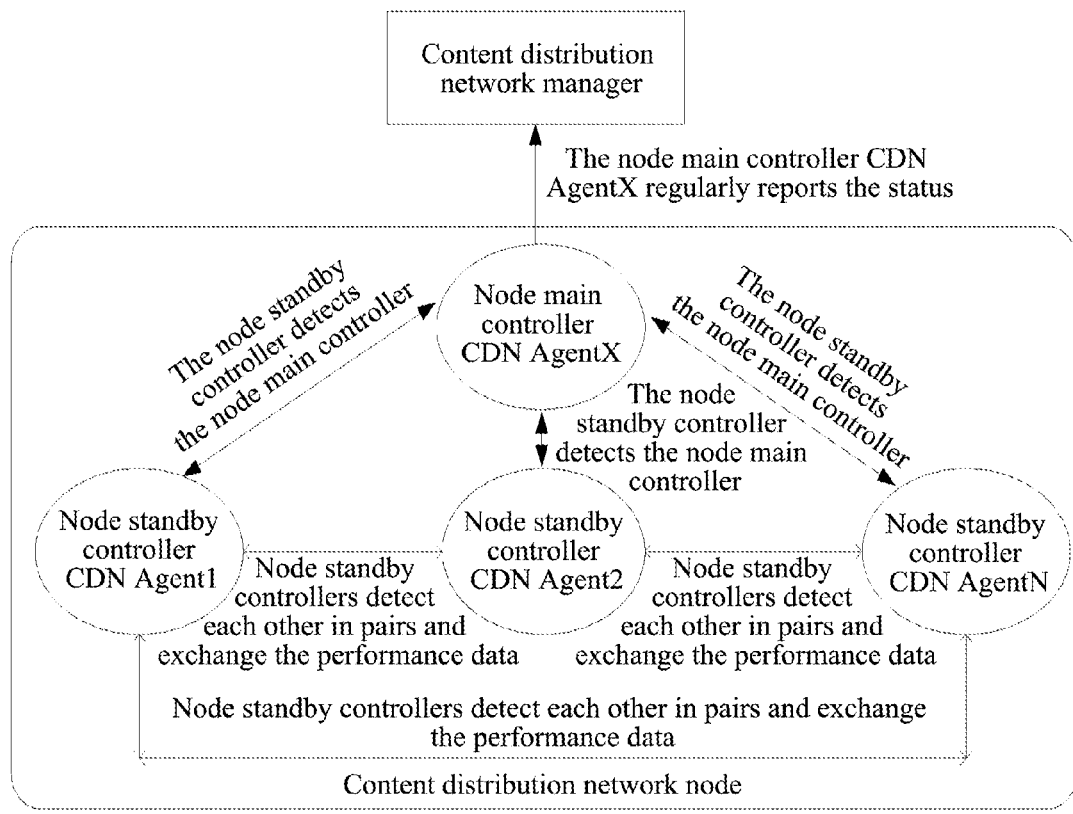
FIG. 1 is a relationship schematic diagram of various logic entities when a node main controller does not switch according to a specific method embodiment of the present invention.

As shown in FIG. 1, a specific embodiment of the content distribution network (CDN) of the present invention includes a manager, one node main controller and at least one node standby controller, wherein the manager is configured to take charge of traffic load balance of the CDN, and the node main controller is configured to control the CDN node, and the node standby controller is configured to detect the node main controller and when detecting that the node main controller is abnormal, it selects one node standby controller to be a new node main controller by replacement.

A first node standby controller which firstly detects that the node main controller is abnormal selects a second node standby controller complying with a preset rule as the new node main controller and sends a switching request to notify the second node standby controller. The second node standby controller is switched to be the new node main controller based on the switching request, and it notifies the switching result to other standby controllers and reports to the manager. In a specific embodiment, the second node standby controller notifies its own status after modification to other standby controllers specifically through sending a broadcast message. The second node standby controller reports the status to the manager specifically through sending a heartbeat message.

The node standby controller is configured to regularly detect the node main controller, which specifically can be carried out through the heartbeat message.

The preset rule includes a rule of selecting the node standby controller with a normal status and an optimal performance according to the status and the performance parameter of the node standby controller; the performance parameter includes a CPU usage rate and I/O waiting time. In a specific embodiment, the node standby controller with a minimum weighted value of the CPU usage rate and I/O waiting time can be selected. The node standby controller is further configured to detect other node standby controller, exchange and store performance parameters of opposite side mutually. The node standby controller is configured to regularly detect other node standby controllers, which specifically can be carried out through the heartbeat message.

The second node standby controller is further configured to set its own status as the node main controller based on the switching request.

The manager is configured to set a configured first node controller as the node main controller and set a subsequently configured node controller and a newly added node controller as the node standby controller. In an embodiment, the manager can set the node controller with a normal function and an optimal performance as the node main controller. The node main controller is further configured to, when returning to normal after abnormal, set itself as the node standby controller.

The manager is further configured to, after receiving the switching result, send the service signaling to the new node main controller.

The manager is further configured to, when not receiving the heartbeat message of the current node main controller, not send the service signaling to the current node main controller temporarily. The current node main controller regularly reports its status to the manager, to indicate that it is the node main controller, and the manager sends the service of current node to the current node main controller.

Figure 2:
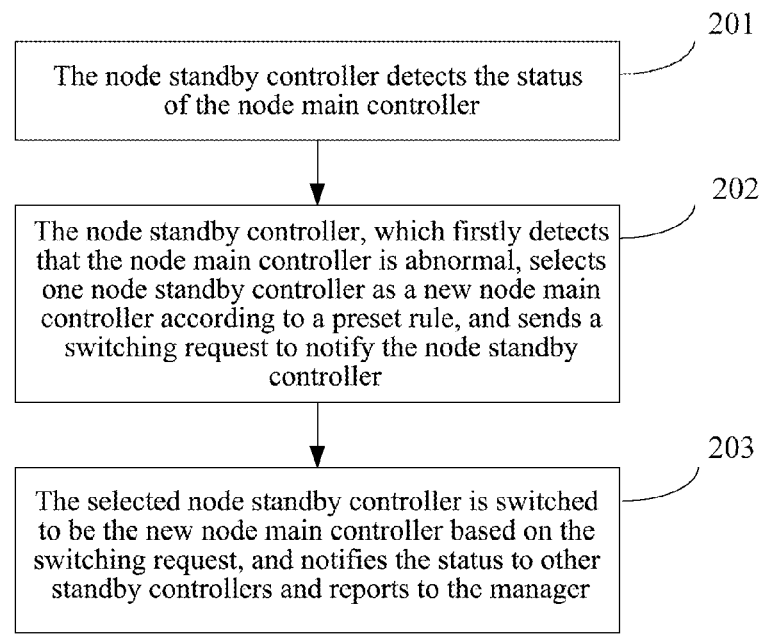
FIG. 2 is a flow chart of one specific embodiment according to a method of the present invention.

A method for switching node main-standby controller based on CDN in the present invention, of which an embodiment is shown in FIG. 2, includes the following steps:

step 201, a node standby controller detects the status of the node main controller; all node standby controllers detect the status of the node main controller.

Step 202, the node standby controller, which firstly detects that the node main controller is abnormal, selects one node standby controller as a new node main controller according to a preset rule, and sends a switching request to notify the node standby controller.

In a specific embodiment, the node standby controller detects other node standby controllers, exchanges and stores performance parameters of opposite side mutually. The node standby controller can regularly detect other node standby controllers, and also can carry out the detection specifically through a heartbeat message. The preset rule includes a rule of selecting the node standby controller with a normal status and an optimal performance according to the status and the performance parameter of the node standby controller; the performance parameter includes a CPU usage rate and I/O waiting time. The node standby controller, which firstly finds that the node main controller is abnormal, can select the node standby controller with a minimum weighted value of the CPU usage rate and I/O waiting time according to the stored status and performance parameter of the node standby controller.

Step 203, the selected node standby controller is switched to be the new node main controller based on the switching request and can switch itself to be the node main controller specifically through setting its own status as the node main controller. After setting the status, the selected node standby controller notifies the status to the other standby controllers and reports to the manager. In a specific embodiment, the new node main controller notifies its number to other standby controllers specifically through sending the broadcast message.

If the status of the original node main controller returns to normal or a node controller is newly added, then the node main controller returning to normal or the newly added node controller sets itself as the node standby controller, and then detects whether there is a node main controller in the present node; if there is a node main controller, then proceed to step 201; if there is no node main controller, then search one node standby controller with a normal status and an optimal performance and switch it to be the node main controller.

The node main controller and the manager communicate abnormally, however, the status of the node main controller own is good. At this time, the node main controller still provides services for the users in the present node, however, the manager does not receive the status reporting of the node main controller for a long time, thus the manager does not send any service signaling to the node main controller until the communication is normal and the manager receives the status reporting of the node main controller again.

A method for switching node main-standby controller based on CDN in the present invention, of which the relationship between various logic entities is shown in FIG. 1, all node standby controllers detect the node main controller, and all node standby controllers detect each other in pairs and exchange the performance parameters; the current node main controller regularly reports its status to the manager, to indicate that it is the node main controller, and the manager sends the service of the current node to the current node main controller.

Figure 3:
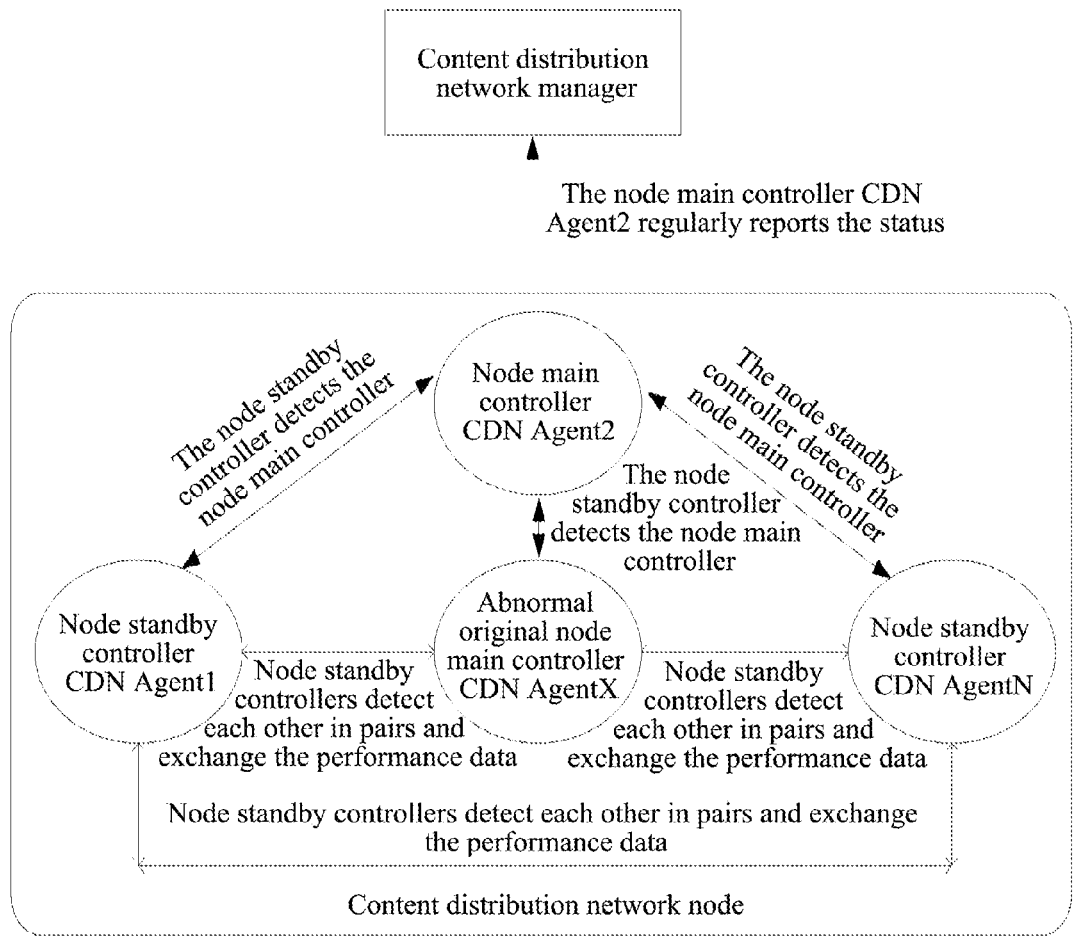
FIG. 3 is a relationship schematic diagram of various logic entities after a node main controller switches according to a specific method embodiment of the present invention.

A method for switching node main-standby controller based on CDN in the present invention, after the node main-standby controller switches, the relationship between various logic entities is shown in FIG. 3. The original node main controller which is switched to the node standby controller and other node standby controllers detect each other in pairs and exchange the performance parameters. After the original node standby controller with a normal status and an optimal performance is switched to be the new node main controller, all node standby controllers detect the status of new node main controller, and the new node main controller regularly reports the status to the manager.

Figure 4:
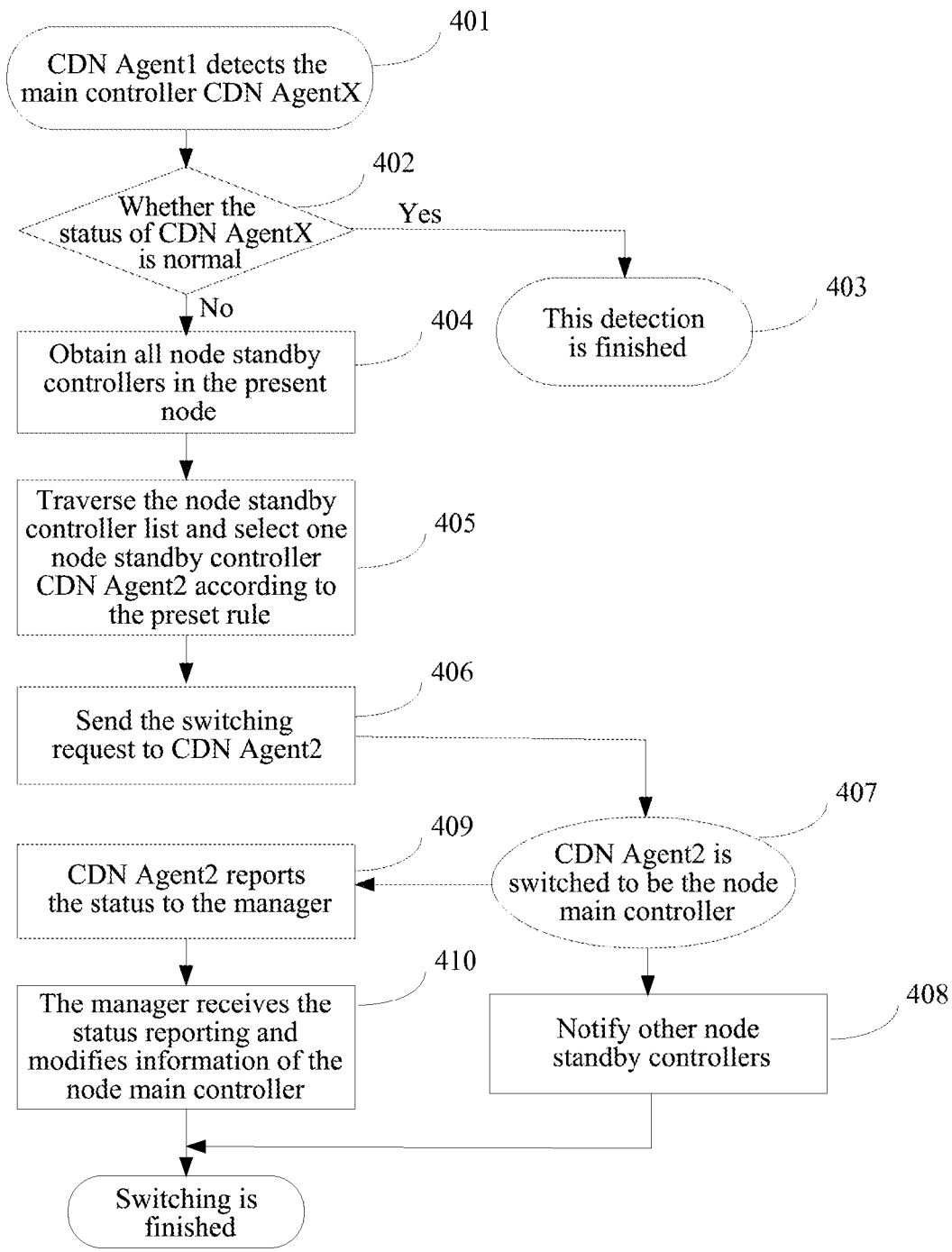
FIG. 4 is a flow chart of switching a node standby controller by triggering according to a specific method embodiment of the present invention.

A method for switching node main-standby controller based on CDN is described in detail hereafter, as shown in FIG. 4. The description takes that the node standby controller CDN Agent1 firstly detects that the current node main controller is abnormal as an example, wherein, CDN AgentX is the current node main controller.

Step 401, CDN Agent1 detects the main controller CDN AgentX; CDN Agent1 regularly detects the current main controller CDN AgentX, and can carry out the detection specifically through the heartbeat message;

step 402, judge whether the status of CDN AgentX is normal; CDN Agent1 judges whether the status of CDN AgentX is normal, and if normal, proceed to step 403, or else proceed to step 404;

step 403, this detection is finished; the status of CDN AgentX is normal, then this detection is finished, and CDN AgentX waits for next detection;

step 404, when the status of CDN AgentX is abnormal, CDN Agent1 obtains all node standby controllers in the present node; CDN Agent1 obtains all node standby controllers in the present node from the memory;

step 405, traverse the node standby controller list and select one node standby controller CDN Agent2 according to the preset rule; CDN Agent1 traverses the node standby controller list, and in the present specific embodiment, CDN Agent1 selects one node standby controller CDN Agent2 with a normal status and a minimum weighted value of the CPU usage rate and I/O waiting time; CDN Agent1 also can select the node standby controller according to other preset rules;

step 406, CDN Agent1 sends the switching request to CDN Agent2; CDN Agent1 sends the switching request to CDN Agent2, requesting to switch CDN Agent2 to be the node main controller;

step 407, CDN Agent2 is switched to be the node main controller; CDN Agent2, after receiving the switching request, switches itself to be the node main controller based on the switching request; in a specific embodiment, CDN Agent2 can update its own status as the node main controller;

step 408, notify other node standby controllers; CDN Agent2 notifies all other node standby controllers that CDN Agent2 is the new node main controller; CDN Agent2 can notify other node standby controllers specifically through the broadcast message, and other node standby controllers detect the new node main controller at the preset time;

step 409, CDN Agent2 reports the status to the manager;

step 410, the manager receives the status reporting and modifies the node main controller information; the manager, after receiving the status of the new node main controller, updates the parameter of the present node main controller in the upper layer service, and the manager only sends the service to the new node main controller;

so far, this switching flow is finished.

The above content further describes the present invention in detail with reference to the preferred embodiments of the present invention and is not intended to limit specific embodiments of the present invention. Those skilled in the art can make several simple deductions or replacements without departing from the conception of the present invention. And all of these deductions or replacements should be considered in the protection scope of the present invention.

What is claimed is:

1. A method for switching a node main-standby controller based on a content distribution network (CDN), comprising:
   A, all node standby controllers detecting status of a current node main controller;
   B, the all node standby controllers, detecting other node standby controllers respectively and exchange and store performance parameters mutually;
   C, when the current node main controller is abnormal, a node standby controller from along the all node standby controllers which firstly detects that the current node main controller is abnormal selecting one node standby controller to be a new node main controller by replacement according to a preset rule and sending a switching request to notify the selected node standby controller; and
   D, the selected node standby controller being switched to be the new node main controller based on the switching request, notifying a switching result to other standby controllers and reporting to a manager;
   wherein, the preset rule comprises a rule of selecting the one node standby controller with a normal status and an optimal performance according to the stored status and the performance parameters of the node standby controller.

2. The method according to claim 1, wherein, the all node standby controller detect the status of the node main controller through a heartbeat message.

3. The method according to claim 1, wherein, the performance parameters comprises a CPU usage rate and I/O waiting time.

4. The method according to claim 1, wherein, in step D, the selected node standby controller is switched to be the new node main controller through setting own status as the node main controller.

5. The method according to claim 1, wherein, in step D, the selected node standby controller notifies the switching result to other standby controllers through sending a broadcast message.

6. The method according to claim 1, before the all node standby controllers detecting the status of the current node main controller, further comprising a step that the manager sets a configured first node controller as the node main controller and sets a subsequently configured node controller and a newly added node controller as the node standby controller; after step D, further comprising a step that an abnormal node main controller, after returning to normal, sets self as the node standby controller.

7. The method according to claim 1, wherein, in step D, the manager, after receiving the switching result, sends a service signaling to the new node main controller.

8. The method according to claim 1, wherein, step D further comprises that the manager, when receiving no heartbeat message of the current node main controller, does not send a service signaling temporarily.

9. A content distribution network (CDN), comprising a manager, one node main controller and at least one node standby controller, wherein, the manager is configured to take charge of traffic load balance of the CDN, and the node main controller is configured to control a CDN node, and the node standby controller is configured to detect the node main controller and when detecting that the node main controller is abnormal, select one node standby controller to be a new node main controller by replacement;
   wherein, a first node standby controller which firstly detects that the node main controller is abnormal selects a second node standby controller complying with a preset rule as the new node main controller and sends a switching request to notify the second node standby controller, and the second node standby controller is switched to be the new node main controller based on the switching request, notifies a switching result to other standby controllers and reports to the manager; and
   wherein, all node standby controllers detect each other in pairs, and exchange and store performance parameters of opposite side mutually; the preset rule comprises a rule of selecting the second node standby controller with a normal status and an optimal performance according to the stored status and the performance parameters of the first node standby controller.

10. The CDN according to claim 9, wherein, the second node standby controller is further configured to set own status as the node main controller based on the switching request.

11. The CDN according to claim 9, wherein, the manager is configured to set a configured first node controller as the node main controller and set a subsequently configured node controller and a newly added node controller as the node standby controller; and the node main controller is further configured to, when returning to normal after abnormal, set self as the node standby controller.

12. The CDN according to claim 10, wherein, the manager is configured to set a configured first node controller as the node main controller and set a subsequently configured node controller and a newly added node controller as the node standby controller; and the node main controller is further configured to, when returning to normal after abnormal, set self as the node standby controller.

* * * * *